United States Patent
Zhang et al.

(10) Patent No.: US 9,998,038 B1
(45) Date of Patent: Jun. 12, 2018

(54) FAN MOTOR POWER-OFF AUTOMATIC BRAKING CIRCUIT

(71) Applicant: ASIA VITAL COMPONENTS CO., LTD., New Taipei (TW)

(72) Inventors: Hu Zhang, New Taipei (CN); Xi-Sheng Jiang, New Taipei (CN)

(73) Assignee: Asia Vital Components Co., Ltd., New Taipei (TW)

( * ) Notice: Subject to any disclaimer, the term of this patent is extended or adjusted under 35 U.S.C. 154(b) by 0 days. days.

(21) Appl. No.: 15/406,769

(22) Filed: Jan. 15, 2017

(51) Int. Cl.
*H02P 3/22* (2006.01)

(52) U.S. Cl.
CPC ..................... *H02P 3/22* (2013.01)

(58) Field of Classification Search
USPC .............. 318/379, 670, 514, 400.29, 400.17, 318/400.26
See application file for complete search history.

(56) References Cited

U.S. PATENT DOCUMENTS 4,705,997 A * 11/1987 Juzswik .................... H02P 7/04
318/293
9,231,631 B1 * 1/2016 Ke ........................ H04B 1/1036

9,577,551 B2 * 2/2017 Aiura ........................ H02P 8/12
2013/0200825 A1 8/2013 Taniguchi et al.

FOREIGN PATENT DOCUMENTS

TW        I289001 B    10/2007
TW        M496896 U    3/2015

* cited by examiner

*Primary Examiner* — Bentsu Ro
*Assistant Examiner* — Iftekhar Mustafa
(74) *Attorney, Agent, or Firm* — C. G. Mersereau; Nikolai & Mersereau, P.A.

(57) ABSTRACT

A fan motor power-off automatic braking circuit includes an energy storage unit, a motor drive circuit, a control unit and a resistance unit connected with an input power. The energy storage unit is electrically connected with the motor drive circuit for receiving and storing an operation voltage. The motor drive circuit has multiple upper arm switch components, multiple lower arm switch components, a first drive unit and a second drive unit. The control unit is respectively electrically connected with the lower arm switch components and the first and second drive units. When the fan is powered off, the energy storage unit provides the operation voltage to the upper arm switch components to switch on the same, whereby the upper arm switch components and the motor winding form a closed loop to achieve braking effect.

8 Claims, 3 Drawing Sheets

FAN MOTOR POWER-OFF AUTOMATIC BRAKING CIRCUIT

BACKGROUND OF THE INVENTION

1. Field of the Invention

The present invention relates generally to a fan motor power-off automatic braking circuit, and more particularly to a fan motor power-off automatic braking circuit, which has automatic braking function.

2. Description of the Related Art

In the recent years, a microcontroller unit (MCU) is often associated with a power electronic switch driving circuit to design an electronic product in this field. However, when operating the electronic product, the digital microcontroller and the power electronic switch are often operated at a high frequency to make the electronic product generate high heat. Therefore, it has become a quite critical design issue how to quickly dissipate the heat of the electronic product. At the present time, the most often seen heat dissipation means is a fan system, which operates to forcedly carry away the heat of the electronic product. However, in consideration of the control of the fan and the security in operation of a user, the fan system is generally combined with a braking circuit, whereby when the fan system is powered off, the braking circuit can stop the fan system from operating. This can ensure the precision of the control of the fan and the operational safety of the user.

Please refer to FIG. 1, which is a circuit diagram of a conventional fan braking circuit 1. The conventional fan braking circuit 1 includes a bridge driver 11, a controller 13, a braking circuit 14 and a motor winding L. An input power Vin is connected to the bridge driver 11, the controller 13 and the braking circuit 14 to provide necessary power for these components. The bridge driver 11 is composed of two upper arm switches M1, M2 and two lower arm switches M3, M4. When the fan is powered off, by means of the control of the braking circuit 14, a braking effect is provided for the fan so as to immediately stop the fan from operating. However, in the conventional fan braking circuit 1, it is necessary for the controller 13 to generate pulse width modulation (PWM) signal to the two upper arm switches M1, M2 to make split control instead of generate pulse width modulation (PWM) signal to the two lower arm switches M3, M4 to make split control. In this case, the temperature of the two upper arm switches M1, M2 and the controlling resistor will rise. Therefore, it is necessary to increase the number of the electronic components (such as the resistors) to solve the problem of temperature rise. Moreover, the two lower arm switches M3, M4 are electrically connected with the braking circuit 14. As a result, the cost will be increased due to the arrangement of the braking circuit 14. Also, the complexity of connection between the circuits will be increased.

SUMMARY OF THE INVENTION

It is therefore a primary object of the present invention to provide a fan motor power-off automatic braking circuit including a resistance unit for providing braking function. When the fan is powered off, an energy storage unit provides an operation voltage to multiple upper arm switch components of a motor drive circuit, whereby the upper arm switch components and a motor winding form a closed loop to achieve braking effect.

It is a further object of the present invention to provide the above fan motor power-off automatic braking circuit, which can save cost.

To achieve the above and other objects, the fan motor power-off automatic braking circuit of the present invention includes an energy storage unit, a motor drive circuit, a control unit and a resistance unit. The energy storage unit serves to receive and store an operation voltage. The motor drive circuit has multiple upper arm switch components, multiple lower arm switch components, a first drive unit and a second drive unit. A first end of the upper arm switch components is electrically connected with the energy storage unit to receive the operation voltage. A second end of the upper arm switch components is respectively electrically connected with a first end of the lower arm switch components and a motor winding. A second end of the lower arm switch components is connected with a grounding terminal. A first end of the first and second drive units is respectively electrically connected with a corresponding third end of the upper arm switch components. The control unit is electrically connected with a corresponding third end of the lower arm switch components and a second end of the first and second drive units. One end of the resistance unit is electrically connected with an input power. The other end of the resistance unit is electrically connected with a corresponding third end of the first and second drive units. A fourth end of the first and second drive units is electrically connected with the grounding terminal. When the fan is powered off, the upper arm switch components receive the operation voltage provided by the energy storage unit and are switched on, while the lower arm switch components fail to receive the operation voltage and are not switched on, whereby the upper arm switch components and the motor winding form a closed loop to achieve braking effect and save cost.

In the above fan motor power-off automatic braking circuit, the upper arm switch components include a first upper arm switch component and a second upper arm switch component. The first ends of the first and second upper arm switch components are electrically connected with the energy storage unit. The second ends of the first and second upper arm switch components are respectively electrically connected with two ends of the motor winding. The third ends of the first and second upper arm switch components are respectively electrically connected with the corresponding first ends of the first and second drive units.

In the above fan motor power-off automatic braking circuit, the lower arm switch components include a first lower arm switch component and a second lower arm switch component. The first ends of the first and second lower arm switch components are respectively electrically connected with the corresponding two ends of the motor winding. The second ends of the first and second lower arm switch components are respectively electrically connected with the grounding terminal. The third ends of the first and second lower arm switch components are respectively electrically connected with the control unit.

In the above fan motor power-off automatic braking circuit, the resistance unit is a resistor. One end of the resistance unit is electrically connected with the input power. The other end of the resistance unit is electrically connected with the corresponding third ends of the first and second drive units.

In the above fan motor power-off automatic braking circuit, the control unit is a central processing unit or a microcontroller unit.

In the above fan motor power-off automatic braking circuit, the first drive unit includes a first transistor, a first resistor, a second resistor, a third resistor, a fourth resistor and a first capacitor. The first transistor has a base, an emitter and a collector. The collector of the first transistor is electrically connected with one end of the second resistor. The emitter of the first transistor is electrically connected with one end of the third resistor and the grounding terminal. The other end of the third resistor, one end of the first capacitor, one end of the first resistor, the other end of the second resistor and the third end of the first upper arm switch component are electrically connected with each other. The other end of the first resistor and the other end of the first capacitor are commonly connected with the other end of the resistance unit. One end of the fourth resistor is electrically connected with the base of the first transistor. The other end of the fourth resistor is electrically connected with the control unit.

In the above fan motor power-off automatic braking circuit, the second drive unit includes a second transistor, a fifth resistor, a sixth resistor, a seventh resistor, an eighth resistor and a second capacitor. The second transistor has a base, an emitter and a collector. The collector of the second transistor is electrically connected with one end of the seventh resistor. The emitter of the second transistor is electrically connected with one end of the sixth resistor and the grounding terminal. The other end of the sixth resistor, one end of the second capacitor, one end of the fifth resistor, the other end of the seventh resistor and the third end of the second upper arm switch component are electrically connected with each other. The other end of the fifth resistor and the other end of the second capacitor are commonly connected with the other end of the resistance unit. One end of the eighth resistor is electrically connected with the base of the second transistor. The other end of the eighth resistor is electrically connected with the control unit.

In the above fan motor power-off automatic braking circuit, the resistance unit is a 0-ohm resistor.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
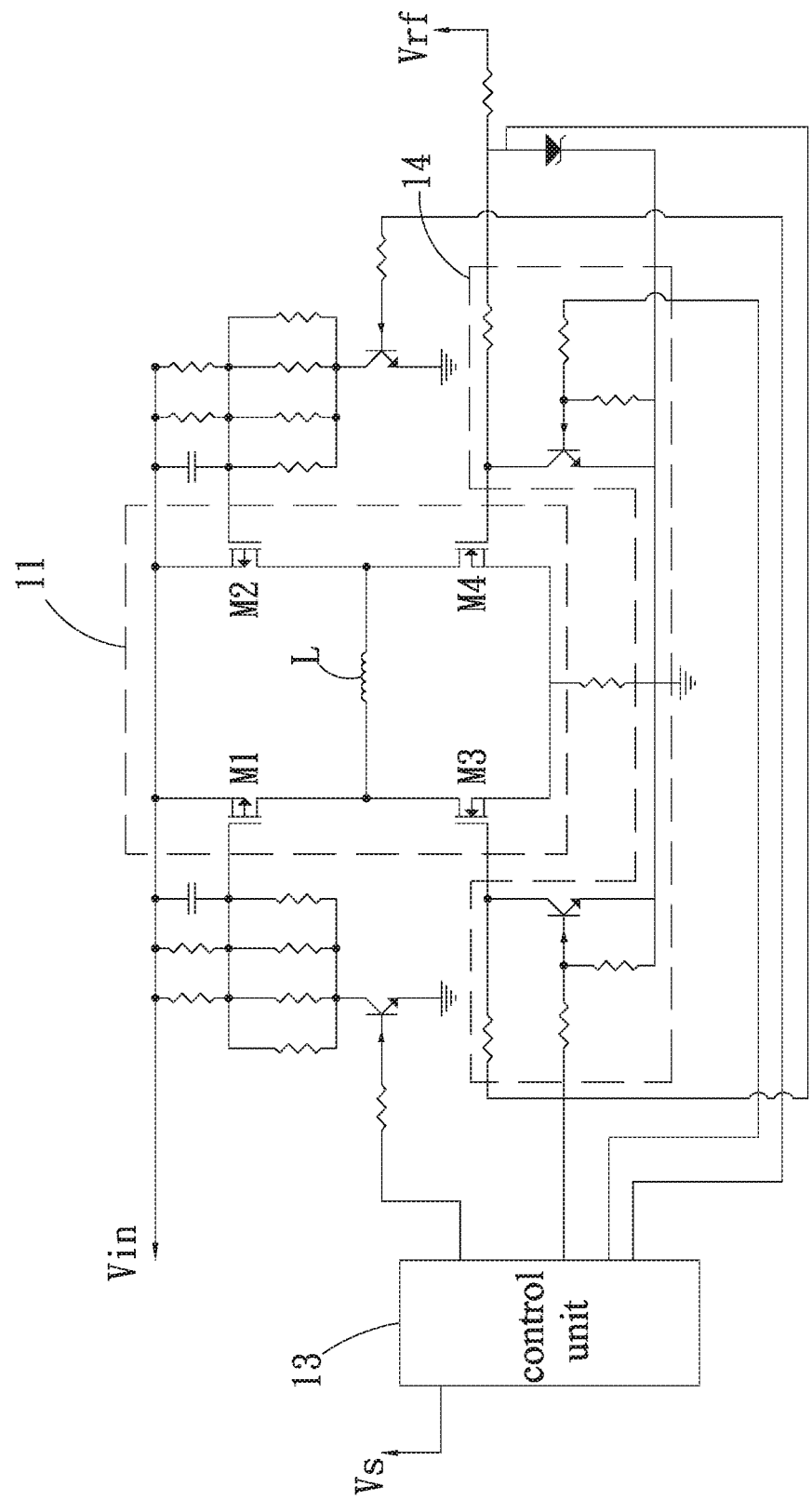
FIG. 1 is a circuit diagram of a conventional fan braking circuit.
Figure 2:
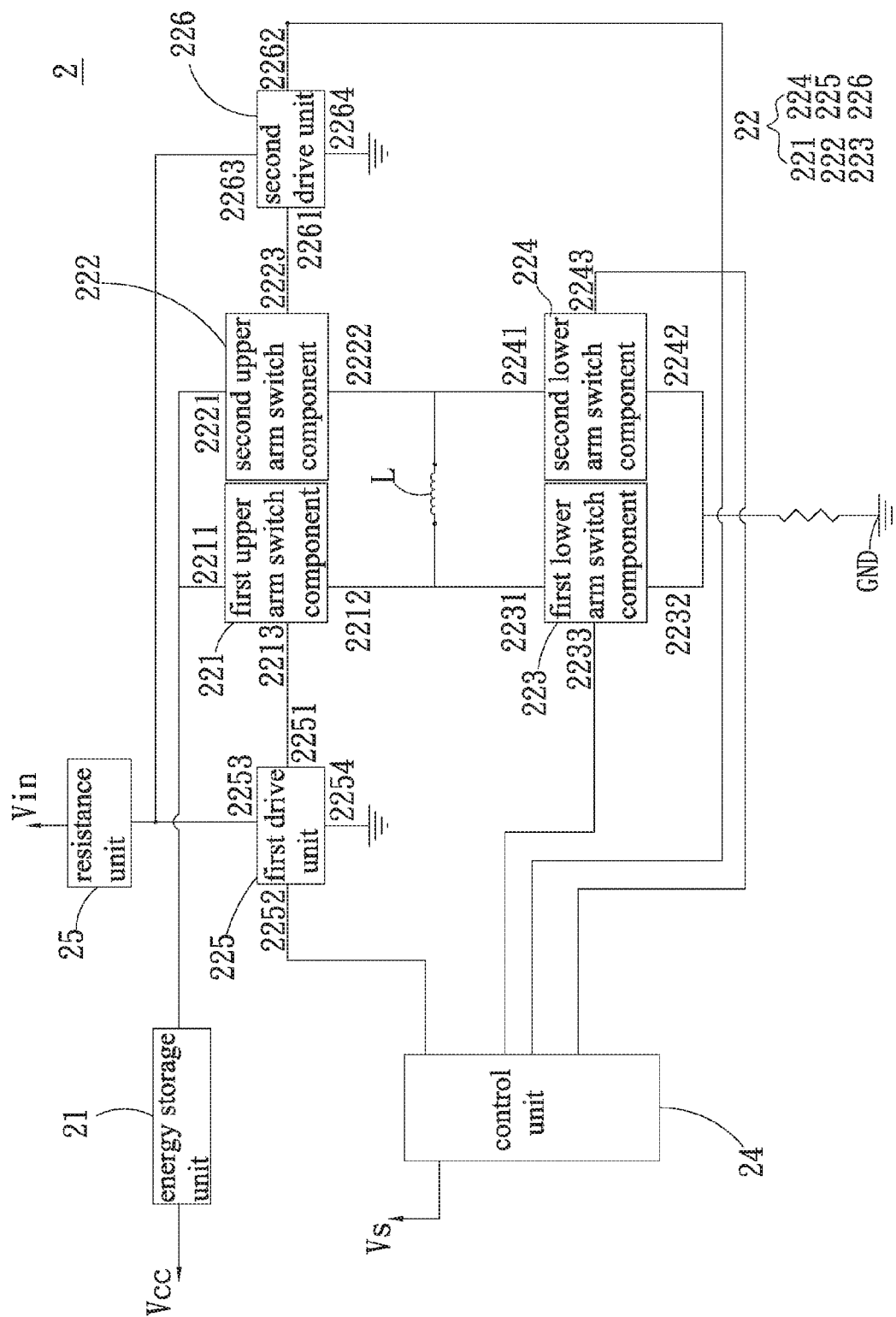
FIG. 2 is a block diagram of a preferred embodiment of the present invention.
Figure 3:
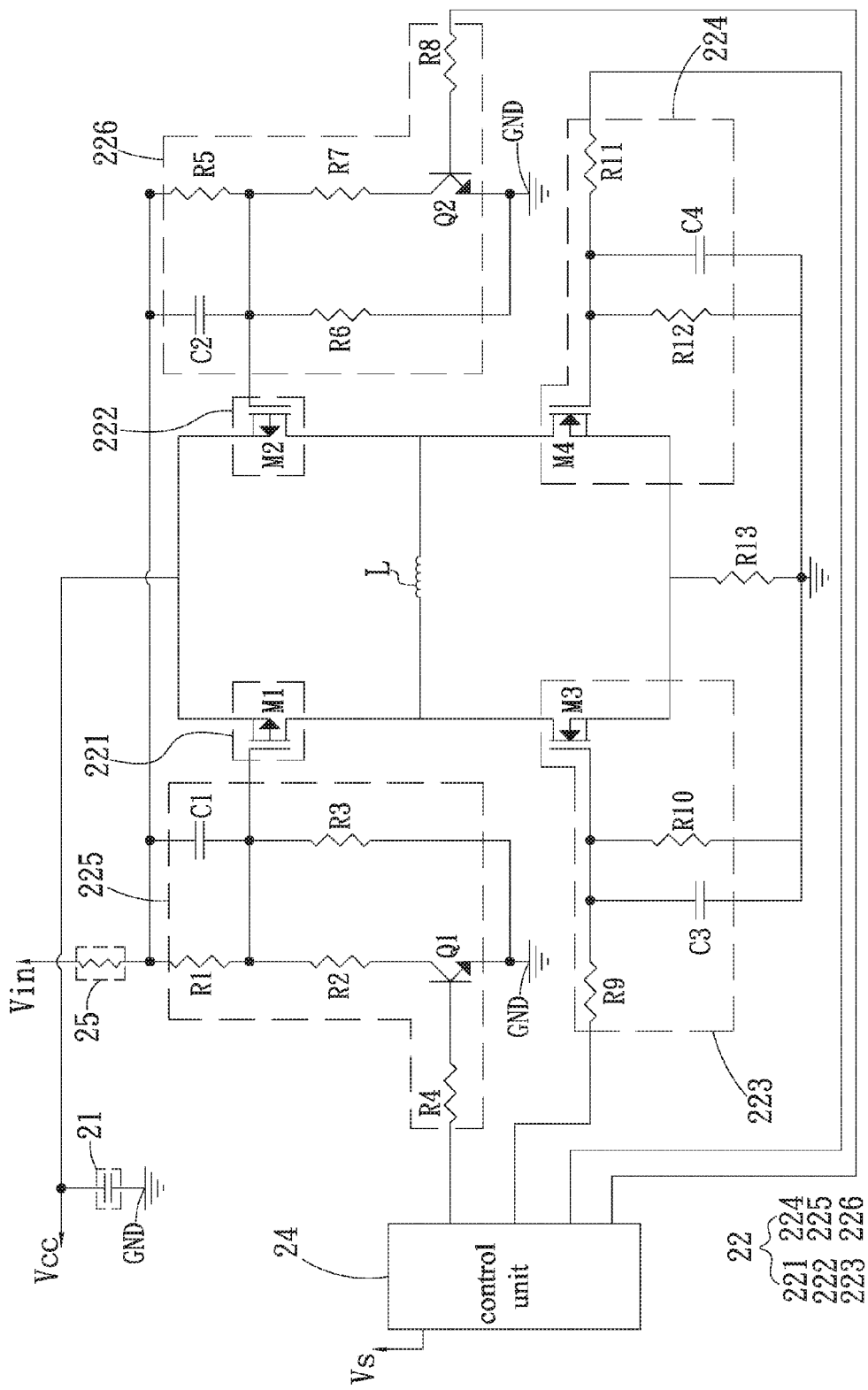
FIG. 3 is a circuit diagram of the preferred embodiment of the present invention.

Please refer to FIGS. 2 and 3. FIG. 2 is a block diagram of a preferred embodiment of the present invention. FIG. 3 is a circuit diagram of the preferred embodiment of the present invention. The fan motor power-off automatic braking circuit 2 of the present invention is applied to a fan such as an axial-flow fan or a centrifugal fan (not shown). The circuit 2 includes an energy storage unit 21, a motor drive circuit 22, a control unit 24 and a resistance unit 25. In this embodiment, the energy storage unit 21 is a capacitor. The energy storage unit 21 serves to receive and store an operation voltage Vcc (such 12 volts). The motor drive circuit 22 has multiple upper arm switch components, multiple lower arm switch components, a first drive unit 225 and a second drive unit 226. In this embodiment, the upper arm switch components are two upper arm switch components, that is, a first upper arm switch component 221 and a second upper arm switch component 222. Each of the first and second upper arm switch components 221, 222 has a first end 2211, 2221, a second end 2212, 2222 and a third end 2213, 2223. The first ends 2211, 2221 of the first and second upper arm switch components 221, 222 (the upper arm switch components) are electrically connected with the energy storage unit 21 to receive the operation voltage Vcc. The second ends 2212, 2222 of the first and second upper arm switch components 221, 222 (the upper arm switch components) are electrically connected with two ends of the motor winding L. The third ends 2213, 2223 of the first and second upper arm switch components 221, 222 (the upper arm switch components) are respectively electrically connected with a first end 2251 of the first drive unit 225 and a first end 2261 of the second drive unit 226.

In this embodiment, the lower arm switch components are two lower arm switch components, that is, a first lower arm switch component 223 and a second lower arm switch component 224. Each of the first and second lower arm switch components 223, 224 has a first end 2231, 2241, a second end 2232, 2242 and a third end 2233, 2243. The first ends 2231, 2241 of the first and second lower arm switch components 223, 224 (the lower arm switch components) are respectively electrically connected with the second ends 2212, 2222 of the first and second upper arm switch components 221, 222. The second ends 2232, 2242 of the first and second lower arm switch components 223, 224 (the lower arm switch components) are electrically connected with a grounding terminal GND. The third ends 2233, 2243 of the first and second lower arm switch components 223, 224 (the lower arm switch components) are respectively electrically connected with the control unit 24. Each of the first and second drive units 225, 226 has the first end 2251, 2261, a second end 2252, 2262, a third end 2253, 2263 and a fourth end 2254, 2264. The first ends 2251, 2261 of the first and second drive units 225, 226 are respectively electrically connected with the third ends 2213, 2223 of the upper arm switch components. The second ends 2252, 2262 of the first and second drive units 225, 226 are respectively electrically connected with the control unit 24. The third ends 2253, 2263 of the first and second drive units 225, 226 are electrically connected with the other end of the resistance unit 25. The fourth ends 2254, 2264 of the first and second drive units 225, 226 are electrically connected with the grounding terminal GND. One end of the resistance unit 25 is electrically connected with an input power Vin. The input power Vin (such as 12 volts) serves to supply power.

In addition, the resistance unit 25 is a resistor. In this embodiment, the resistance unit 25 is a 0-ohm resistor. The control unit 24 is a central processing unit (CPU) or a microcontroller unit (MCU). The control unit 24 has multiple contact pins. The four contact pins of the control unit 24 are respectively connected with the second ends 2252, 2262 of the first and second drive units 225, 226 and the third ends 2233, 2243 of the first and second lower arm switch components 223, 224. The four contact pins of the control unit 24 serve to output a pulse width modulation (PWM) signal to control the first and second drive units 225, 226 to respectively drive and switch the corresponding first and second upper arm switch components 221, 222, (for example, switch on or switch off) and control and switch the first and second lower arm switch components 223, 224, (for example, switch on or switch off). Another contact pin (such as the fifth contact pin) of the control unit 24 is electrically connected with a Hall element (not shown) to receive the Hall signal transmitted from the Hall element. Another contact pin (such as the sixth contact pin) of the control unit 24 serves to receive a working voltage Vs (such as 5 volts). Accordingly, by means of the resistance unit 25 of the present invention, the circuit has braking function. In addition, when powered off, the energy storage unit 21 provides the operation voltage Vcc for the first and second upper arm switch components 221, 222 of the motor drive circuit 22 to switch on, whereby the first and second upper arm switch components 221, 222 and two ends of the motor winding L are short-circuited to form a closed loop and thus achieve the braking effect. After the fan is powered off, the blades of the fan will keep rotating (or operating) due to their own inertia. By means of the design of the circuit 2 of the present invention and according to Faraday's law, the motor winding L on the closed loop is a closed winding to generate induced current. The induced current will make the motor winding L generate a reverse magnetic field to stop the blades from operating. In this case, the fan can quickly stop to achieve a braking effect.

Please now refer to FIG. 3. The structures of the present invention will be described in detail as follows:

The first drive unit 225 includes a first transistor Q1, a first resistor R1, a second resistor R2, a third resistor R3, a fourth resistor R4 and a first capacitor C1. In this embodiment, the first transistor Q1 is a bipolar junction transistor (BJT). The first transistor Q1 has a base, an emitter and a collector. The collector of the first transistor Q1 is electrically connected with one end of the second resistor R2. The emitter of the first transistor Q1 is electrically connected with one end of the third resistor R3 and the grounding terminal GND. The other end of the third resistor R3 (the first end 2251 of the first drive unit 225), one end of the first capacitor C1, one end of the first resistor R1, the other end of the second resistor R2 and the third end 2213 of the first upper arm switch component 221 are electrically connected with each other. In addition, the other end of the first resistor R1 and the other end of the first capacitor C1 are commonly connected with the other end of the resistance unit 25. One end of the fourth resistor R4 is electrically connected with the base of the first transistor Q1. The other end of the fourth resistor R4 is electrically connected with a corresponding contact pin (such as the first contact pin) of the control unit 24.

The second drive unit 226 includes a second transistor Q2, a fifth resistor R5, a sixth resistor R6, a seventh resistor R7, an eighth resistor R8 and a second capacitor C2. The second transistor Q2 has a base, an emitter and a collector. The collector of the second transistor Q2 is electrically connected with one end of the seventh resistor R7. The emitter of the second transistor Q2 is electrically connected with one end of the sixth resistor R6 and the grounding terminal GND. The other end of the sixth resistor R6 (the first end 2261 of the second drive unit 226), one end of the second capacitor C2, one end of the fifth resistor R5, the other end of the seventh resistor R7 and the third end 2223 of the second upper arm switch component 222 are electrically connected with each other. In addition, the other end of the fifth resistor R5 and the other end of the second capacitor C2 are commonly connected with the other end of the resistance unit 25. One end of the eighth resistor R8 is electrically connected with the base of the second transistor Q2. The other end of the eighth resistor R8 is electrically connected with another corresponding contact pin (such as the second contact pin) of the control unit 24.

The first upper arm switch component 221 includes a first upper MOS transistor M1. The second upper arm switch component 222 includes a second upper MOS transistor M2. In this embodiment, the first and second upper MOS transistors M1, M2 are p-channel metal-oxide-semiconductor field-effect transistors (PMOSFET). The sources of the first and second upper MOS transistors M1, M2 (the first ends 2211, 2221 of the first and second upper arm switch components 221, 222) are commonly connected with one end of the energy storage unit 21 (the positive electrode of the energy storage unit 21). The other end of the energy storage unit 21 (the negative electrode of the energy storage unit 21) is electrically connected with the grounding terminal GND. The energy storage unit 21 is electrically connected with a rectifying and voltage-stabilizing circuit (not shown). The rectifying and voltage-stabilizing circuit serves to receive the input power Vin (such as 12 volts) and rectify and stabilize the input power Vin and then output the operation voltage Vcc (such as 12 volts) to the energy storage unit 21. The gates of the first and second upper MOS transistors M1, M2 (the third ends 2213, 2223 of the first and second upper arm switch components 221, 222) are respectively electrically connected with one end of the corresponding first and second capacitors C1, C2. The first lower arm switch component 223 includes a first lower MOS transistor M3, a ninth resistor R9, a tenth resistor R10 and a third capacitor C3. In this embodiment, the first lower MOS transistor M3 is an n-channel metal-oxide-semiconductor field-effect transistor (NMOSFET). The source of the first lower MOS transistor M3 (the first end 2231 of the first lower arm switch component 223) is correspondingly electrically connected with the source of the first upper MOS transistor M1 (the second end 2212 of the first upper arm switch component) and one end of the motor winding L. The gate of the first lower MOS transistor M3 is electrically connected with one end of the ninth and tenth resistors R9, R10 and one end of the third capacitor C3. The other end of the third capacitor C3, the other end of the tenth resistor R10 and the grounding terminal GND are commonly electrically connected with each other. The other end of the ninth resistor R9 (the third end 2233 of the first lower arm switch component 223) is correspondingly connected with another contact pin (such as the third contact pin) of the control unit 24.

The second lower arm switch component 224 includes a second lower MOS transistor M4, an eleventh resistor R11, a twelfth resistor R12 and a fourth capacitor C4. In this embodiment, the second lower MOS transistor M4 is an n-channel metal-oxide-semiconductor field-effect transistor (NMOSFET). The source of the second lower MOS transistor M4 (the first end 2241 of the second lower arm switch component 224) is correspondingly electrically connected with the source of the second upper MOS transistor M2 (the second end 2222 of the second upper arm switch component 222) and the other end of the motor winding L. The gate of the second lower MOS transistor M4 is electrically connected with one end of the eleventh and twelfth resistors R11, R12 and one end of the fourth capacitor C4. The other end of the fourth capacitor C4, the other end of the twelfth resistor R12 and the grounding terminal GND are commonly electrically connected with each other. The other end of the eleventh resistor R11 (the third end 2243 of the second lower arm switch component 224) is correspondingly connected with another contact pin (such as the fourth contact pin) of the control unit 24. In addition, the sources of the first and second lower MOS transistors M3, M4 (the second end 2242 of the second lower arm switch components 224) are electrically connected with one end of a thirteenth resistor R13.

The other end of the thirteenth resistor R13 is electrically connected with the grounding terminal GND.

Accordingly, when the fan is to be actuated, the motor drive circuit 22 receives the input power Vin. Via the PWM signal output by the control unit 24, the motor drive circuit 22 controls the first and second drive units 225, 226 to respectively drive and switch the corresponding first and second upper MOS transistors M1, M2 and control and switch the first and second lower MOS transistors M3, M4 so as to control the operation of the fan and the rotational speed of the fan. At the same time, the energy storage unit 21 will store the received operation voltage Vcc, (that is, the energy storage unit 21 is charged). In case the fan is powered off, the control unit 24 will fail to receive the working voltage Vs and be unable to work. As a result, the potentials of the four contact pins of the control unit 24 that output the PWM signal are 0 voltages. Under such circumstance, the first and second transistors Q1, Q2 of the first and second drive units 225, 226 and the first and second lower MOS transistors M3, M4 are all switched off. At this time, the gates of the first and second upper MOS transistors M1, M2 are respectively connected with the corresponding third and sixth resistors R3, R6 and the negative electrode of the energy storage unit and pulled down into low potential (0 volts). Also, the operation voltage Vcc (12 volts) stored by the energy storage unit 21 is supplied to the sources of the first and second upper MOS transistors M1, M2, whereby the energy storage unit 21 discharges to raise the voltages of the sources of the first and second upper MOS transistors M1, M2 into high potential of 12 volts. At this time, the voltage between the sources and gates of the first and second upper MOS transistors M1, M2 is −12V and the first and second upper MOS transistors M1, M2 are switched on, (that is, the sources and drains of the first and second upper MOS transistors M1, M2 are switched on). Under such circumstance, the first and second upper MOS transistors M1, M2 and two ends of the motor winding L are short-circuited to form a closed loop. After the fan is powered off, the blades of the fan will keep operating due to their own inertia, whereby the motor winding L on the closed loop will generate induced current. The induced current will make the motor winding L generate a reverse magnetic field to stop the blades from operating. In this case, the fan can quickly stop to achieve a braking effect.

According to the above circuit design of the present invention, the resistance unit 25 is serially connected between the input power Vin and the other end of the first resistor R1 and no resistor is serially connected between the other end of the first capacitor C1 and the operation voltage Vcc. Accordingly, the circuit 2 has braking function. Moreover, when powered off, the energy storage unit 21 serves to provide the operation voltage Vcc to the first and second upper arm switch components 221, 222 of the motor drive circuit 22 to switch on the same. In this case, the first and second upper arm switch components 221, 222 and the motor winding L can form a closed loop to achieve the braking effect. In addition, the design of the circuit 2 of the present invention effectively improves the shortcoming of the conventional motor braking circuit that it is necessary to add more extra electronic components into the lower arm switch component to achieve the braking effect. Therefore, the present invention can effectively save cost.

The present invention has been described with the above embodiments thereof and it is understood that many changes and modifications in such as the form or layout pattern or practicing step of the above embodiments can be carried out without departing from the scope and the spirit of the invention that is intended to be limited only by the appended claims.

What is claimed is:

1. A fan motor power-off automatic braking circuit comprising:
an energy storage unit for receiving and storing an operation voltage;
a motor drive circuit having multiple upper arm switch components, multiple lower arm switch components, a first drive unit and a second drive unit, a first end of the upper arm switch components being electrically connected with the energy storage unit to receive the operation voltage, a second end of the upper arm switch components being respectively electrically connected with a first end of the lower arm switch components and a motor winding, a second end of the lower arm switch components being connected with a grounding terminal, a first end of the first and second drive units being respectively electrically connected with a corresponding third end of the upper arm switch components;
a control unit electrically connected with a corresponding third end of the lower arm switch components and a second end of the first and second drive units; and
a resistance unit, one end of the resistance unit being electrically connected with an input power, the other end of the resistance unit being electrically connected with a corresponding third end of the first and second drive units, a fourth end of the first and second drive units being electrically connected with the grounding terminal, when the fan is powered off, the upper arm switch components receiving the operation voltage provided by the energy storage unit and being switched on, while the lower arm switch components failing to receive the operation voltage and being not switched on, whereby the upper arm switch components and the motor winding form a closed loop to achieve braking effect.

2. The fan motor power-off automatic braking circuit as claimed in claim 1, wherein the upper arm switch components include a first upper arm switch component and a second upper arm switch component, the first ends of the first and second upper arm switch components being electrically connected with the energy storage unit, the second ends of the first and second upper arm switch components being respectively electrically connected with two ends of the motor winding, the third ends of the first and second upper arm switch components being respectively electrically connected with the corresponding first ends of the first and second drive units.

3. The fan motor power-off automatic braking circuit as claimed in claim 2, wherein the lower arm switch components include a first lower arm switch component and a second lower arm switch component, the first ends of the first and second lower arm switch components being respectively electrically connected with the corresponding two ends of the motor winding, the second ends of the first and second lower arm switch components being respectively electrically connected with the grounding terminal, the third ends of the first and second lower arm switch components being respectively electrically connected with the control unit.

4. The fan motor power-off automatic braking circuit as claimed in claim 3, wherein the resistance unit is a resistor, one end of the resistance unit being electrically connected with the input power, the other end of the resistance unit being electrically connected with the corresponding third ends of the first and second drive units.

5. The fan motor power-off automatic braking circuit as claimed in claim 1, wherein the control unit is a central processing unit or a microcontroller unit.

6. The fan motor power-off automatic braking circuit as claimed in claim 2, wherein the first drive unit includes a first transistor, a first resistor, a second resistor, a third resistor, a fourth resistor and a first capacitor, the first transistor having a base, an emitter and a collector, the collector of the first transistor being electrically connected with one end of the second resistor, the emitter of the first transistor being electrically connected with one end of the third resistor and the grounding terminal, the other end of the third resistor, one end of the first capacitor, one end of the first resistor, the other end of the second resistor and the third end of the first upper arm switch component being electrically connected with each other, the other end of the first resistor and the other end of the first capacitor being commonly connected with the other end of the resistance unit, one end of the fourth resistor being electrically connected with the base of the first transistor, the other end of the fourth resistor being electrically connected with the control unit.

7. The fan motor power-off automatic braking circuit as claimed in claim 6, wherein the second drive unit includes a second transistor, a fifth resistor, a sixth resistor, a seventh resistor, an eighth resistor and a second capacitor, the second transistor having a base, an emitter and a collector, the collector of the second transistor being electrically connected with one end of the seventh resistor, the emitter of the second transistor being electrically connected with one end of the sixth resistor and the grounding terminal, the other end of the sixth resistor, one end of the second capacitor, one end of the fifth resistor, the other end of the seventh resistor and the third end of the second upper arm switch component being electrically connected with each other, the other end of the fifth resistor and the other end of the second capacitor being commonly connected with the other end of the resistance unit, one end of the eighth resistor being electrically connected with the base of the second transistor, the other end of the eighth resistor being electrically connected with the control unit.

8. The fan motor power-off automatic braking circuit as claimed in claim 4, wherein the resistance unit is a 0-ohm resistor.

* * * * *